United States Patent Office 3,218,275
Patented Nov. 16, 1965

3,218,275
POLYPROPYLENE STABILIZED WITH NICKEL STEARATE AND DITHIOCARBAMATES
William F. Geigle, Springfield, Pa., assignor to Sun Oil Company, Philadelphia, Pa., a corporation of New Jersey
No Drawing. Filed Apr. 17, 1961, Ser. No. 103,221
15 Claims. (Cl. 260—23)

This invention relates to the stabilization of solid, substantially crystalline, isotactic polypropylene, and more particularly to new compositions of matter comprising such a solid polymer of relatively high molecular weight and an inhibitor system therefor.

Solid, substantially crystalline, isotactic polypropylene has been prepared by the polymerization of propylene using a solid catalytic material. A catalyst system which is especially effective for such a polymerization is the combination of a halide of titanium, such as titanium trichloride, and an aluminum trialkyl or an alkyl aluminum halide, such as aluminum triethyl or diethyl aluminum chloride. In a typical procedure, the catalyst is prepared by admixing titanium tetrachloride and aluminum triethyl in an inert solvent, such as isooctane, to produce a reaction product which acts as a catalyst for polymerizing the alpha-olefin to solid polymers. On the other hand, a lower halide, such as titanium trichloride, can be preformed, dispersed in an inert liquid, and an activator, such as an aluminum trialkyl, or an alkyl aluminum halide, added. In performing the polymerization step, the monomer is contacted with the solid catalyst, such as by passing the propylene into the liquid reaction mixture and is thereby polymerized to solid polymers. Anhydrous and oxygen-free conditions are used throughout the process, since the catalyst is deactivated by contact with water or oxygen. Other specific catalyst systems, i.e., other metal halide or metal oxide catalyst systems, as well as the other process condition, necessary for the preparation of the polypropylene described herein are illustrated by pages 350 through 361, pages 416 through 419, pages 452 and 453 of "Linear and Stereoregular Addition Polymers," by Herman F. Mark and Normal G. Gaylord, Interscience Publishers, 1959, the contents of which are incorporated herein by reference.

Polypropylene prepared by the process described above has a melting point of from 160° C. to 175° C., a tensile strength of from 3,000 to 6,000 p.s.i. (pounds per square inch), and an average molecular weight of from 50,000 to 850,000 or more (light-scattering). Usually, a mixture of crystalline and amorphous polymer is obtained. If desired, the amorphous polymer can be separated from the crystalline polymer which is isotactic in nature by contacting a mixture thereof with a hydrocarbon solvent, such as isooctane or n-heptane, at an elevated temperature. The amorphous polymer is substantially soluble under these conditions, whereas the crystalline polymer is substantially insoluble. The compositions of the present invention are prepared from either crystalline polymers, or mixtures of crystalline with amorphous polymers, in which mixtures the degree of crystallinity is at least 25%, and preferably at least 50%, by weight of the polymer mixture as determined by X-ray diffraction.

Such polymers may be molded or otherwise fabricated to form many useful articles. However, the above-described polypropylene is susceptible to degradation caused by exposure to light. Particularly severe degradation of polypropylene takes place when it is exposed to light in the ultra-violet portion of the spectrum. This degradation apparently results from free-radical formation, which formation is promoted by ultraviolet light and impurities such as metals and metal compounds. The free-radicals which are formed undergo further chemical reactions, resulting in undesirable chemical and physical transformations. Thus polypropylene deteriorates prematurely, loses tensile strength, molecular weight and other desirable properties, such as pliability and impact strength, and becomes discolored and embrittled.

An object of the present invention is to provide compositions comprising substantially crystalline, isotactic, solid polypropylene containing a minor quantity of a composition effective to stabilize the polymer against degradation. It is a specific object of this invention to provide compositions comprising the above-described polypropylene containing minor quantities of a stabilizing composition effective to substantially prevent degradation of the polymer caused by exposure to light, particularly the ultra-violet portion of the spectrum. It is a further object to provide a method for so-stabilizing polypropylene.

According to one embodiment of the present invention, it has been found that remarkably stable polypropylene compositions may be prepared by admixing with the substantially crystalline, solid, isotactic polymer a stabilizing quantity each of nickel stearate and a compound having the general formula:

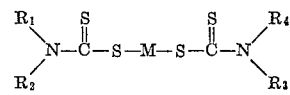

wherein each of $R_1$, $R_2$, $R_3$, and $R_4$ is a monovalent hydrocarbon radical containing 1 to about 18 carbon atoms and M is zinc or calcium. The hydrocarbon radicals may be the same or different alkyl, aralkyl, aryl, or cycloalkyl groups. For example, suitable compounds for use as the stabilizers of this invention include: zinc dipropyldithiocarbamate, calcium dipropyldithiocarbamate, zinc dibutyldithiocarbamate, calcium dibutyldithiocarbamate, zinc dihexyldithiocarbamate, calcium dihexyldithiocarbamate, zinc diheptyldithiocarbamate, calcium diheptyldithiocarbamate, zinc dioctyldithiocarbamate, calcium dioctyldithiocarbamate, zinc dilauryldithiocarbamate, calcium dilauryldithiocarbamate, zinc distearyldithiocarbamate, calcium distearyldithiocarbamate, zinc dibenzyldithiocarbamate, calcium dibenzyldithiocarbamate, zinc dicyclohexyldithiocarbamate, calcium dicyclohexyldithiocarbamate, zinc dicyclopentyldithiocarbamate, calcium dicyclopentyldithiocarbamate, zinc diphenyldithiocarbamate, calcium diphenyldithiocarbamate, zinc dinaphthyldithiocarbamate, calcium dinaphthyldithiocarbamate, and the like. The use of a stabilizing quantity, i.e., from about 0.01% to about 5% by weight of each of the components of the stabilizing composition of this invention, preferably about 0.2% to 2.0% of each component, in combination with the polypropylene described herein imparts remarkable stability thereto against degradation caused by exposure to light, particularly that portion of the spectrum which includes ultra-violet light.

Numerous stabilizers have been disclosed in the prior art for arresting degradation of other olefin polymers. However, it has been found that virtually none of them are useful in the polypropylene of this invention; see page 192, volume 37, No. 5, of "Modern Plastics," January 1960. For example, zinc dibutyldithiocarbamate has been used as a stabilizer in polyisobutylene; however, as will be apparent from the data herein, this compound is entirely ineffective as a light stabilizer for polypropylene. It is clear, then, that the probable mechanism by which the olefin polymers known heretofore degrade is entirely different from the mechanism by which polypropylene degrades. Accordingly, the mechanism by which polypropylene is stabilized is unrelated to that by which other olefin polymers are stabilized.

The stabilizer composition of this invention may be combined with the polypropylene by any method suitable for the preparation of homogeneous mixtures. For example, the polymer may be melted and both of the components of the stabilizer composition admixed therewith by milling on heated rolls, or by using a Banbury mixer. Alternatively, the stabilizer components may be combined, in a solid or molten state, with a solution or suspension of the polymer in a suitable liquid. In another process, one dissolves the stabilizer components in a suitable solvent, admixes powdered polymer therewith, and evaporates the solvent. In another mode of operation, the solid stabilizer composition is thoroughly dry-mixed with the solid polymer. In general, it is preferable that the mixing process be carried out in an inert atmosphere, or under vacuum, in order to prevent oxidation of the polymer.

Since non-stabilized polypropylene is normally drastically degraded when exposed to ultra-violet and visible light, particularly the high ultra-violet and the low visible light, the extent of this degradation is measured in order to determine the effectiveness of the stabilizer composition of this invention. One method of determining the extent of degradation caused by light involves the use of the Carbon-Arc Lamp Test in the Atlas Fade-Ometer substantially in the manner described in Standard Test Method 16A–1957 of the American Association of Textile Chemists and Colorists. According to this test, yarns (multifilaments) or monofilaments under tension are exposed to the light produced by a carbon arc. Every 20 hours the filaments are examined to determine whether or not there has been any breakage. If so, the test is terminated; if not the test is continued until breakage occurs. Meanwhile, at 60 hour intervals the filaments are tested on an Instron Tensile Tester and compared with unexposed filaments. In the illustrative examples given below, the filaments (i.e., mono- or multifilaments) are wound on standard black faced "mirror" cards (6½ x 9⅓ inches) and secured thereto at the margins with cellophane tape. Winding thereof is performed using a Universal winding device at a tension of 0.75 g., and when so-wound, each card contains 3 groups of filaments having 5 to 8 monofilaments or multifilaments in each group.

The following examples are given by way of illustration and not by way of limitation, the scope of the invention being determined by the appended claims. All percentages recited in these examples are by weight based on the total weight of the composition given except where otherwise specified.

EXAMPLES 1–10

Polypropylene monofilaments containing the various additives listed in Table I, as well as a Control containing no additive, were exposed in an Atlas Fade-Ometer, the data compiled in Table I having been obtained by the procedures described above.

*Table I*

| Example | Additive | Denier | Percent tenacity retained Fade-Ometer hours |
|---|---|---|---|
| 1 | None | ~130 | None at 40. |
| 2 | 0.5% ZBu[1] | ~130 | None at 60. |
| 3 | 1.0% ZBu | ~130 | None at 40. |
| 4 | 2.0% ZBu | ~130 | None at 20. |
| 5 | 0.5% NS[2] | ~130 | None at 40. |
| 6 | 1.0% NS | ~130 | Do. |
| 7 | 2.0% NS | ~130 | Do. |
| 8 | 0.5% each of ZBu and NS | 132 | 87.5% at 180. |
| 9 | 1.98% NS and 1.50% ZBu | 126 | 87.0% at 180. |
| 10 | 1.32% NS and 1.00% ZBu | 109 | 116% at 120. |

[1] Zinc dibutyldithiocarbamate.
[2] Nickel stearate.

EXAMPLES 11–18

The procedure of Examples 1–10 was repeated substituting calcium diamyldithiocarbamate for zinc dibutyldithiocarbamate, the data for these examples being tabulated in Table II.

*Table II*

| Example | Additive | Denier | Percent tenacity retained, Fade-Ometer hours | Fade-Ometer, hours to break |
|---|---|---|---|---|
| 11 | None | ~130 | None at 40 | 20 to 40. |
| 12 | 0.5% CA[1] | ~130 | do | 20 to 40. |
| 13 | 1.0% CA | ~130 | None at 20 | 0 to 20. |
| 14 | 0.5% NS[2] | ~130 | None at 40 | 20 to 40. |
| 15 | 1.0% NS | ~130 | do | 20 to 40. |
| 16 | 2.0% NS | ~130 | do | 20 to 40. |
| 17 | 0.5% NS and 0.8% CA | 150 | 94.2% at 120 | 460 to 480. |
| 18 | 1.25% NS and 1.0% CA | 125 | 119% at 120 | |

[1] Calcium diamyldithiocarbamate.
[2] Nickel stearate.

EXAMPLES 19–25

The procedure of Examples 1–10 was again repeated; however, zinc dibenzyldithiocarbamate was substituted for zinc dibutyldithiocarbamate.

*Table III*

| Example | Additive | Denier | Percent tenacity retained, Fade-Ometer hours | Fade-Ometer, hours to break |
|---|---|---|---|---|
| 19 | None | ~130 | None at 40 | 20 to 40. |
| 20 | 0.5% to ZBe[1] | ~130 | do | 20 to 40. |
| 21 | 1.0% ZBe | ~130 | do | 20 to 40. |
| 22 | 0.5% NS[2] | ~130 | do | 20 to 40. |
| 23 | 1.0% NS | ~130 | do | 20 to 40. |
| 24 | 0.5% each of NS and ZBe | 126 | 37% at 300 | 340 to 360. |
| 25 | 1.0% each of NS and ZBe | 132 | 52% at 500 | 580 to 600. |

[1] Zinc dibenzyldithiocarbamate.
[2] Nickel stearate.

The invention claimed is:

1. A light stable polymer composition comprising solid, isotactic, substantially crystalline polypropylene and a stabilizing quantity of a synergistic stabilizer composition comprising nickel stearate and a compound having the formula:

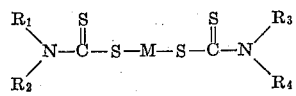

wherein each of $R_1$, $R_2$, $R_3$, and $R_4$ is a hydrocarbon radical containing from 1 to about 18 carbon atoms and M is selected from the group consisting of zinc and calcium.

2. The composition of claim 1 wherein M is zinc.

3. The composition of claim 2 wherein $R_1$, $R_2$, $R_3$, and $R_4$ are butyl.

4. The composition of claim 1 wherein M is calcium.

5. The composition of claim 4 wherein $R_1$, $R_2$, $R_3$, and $R_4$ are amyl.

6. The composition of claim 1 wherein said stabilizing quantity is from about 0.01% to about 5% by weight of each of the components of said stabilizer composition based on the weight of said polymer composition.

7. The composition of claim 6 wherein M is zinc.

8. The composition of claim 7 wherein $R_1$, $R_2$, $R_3$, and $R_4$ are butyl.

9. The composition of claim 6 wherein M is calcium.

10. The composition of claim 9 wherein $R_1$, $R_2$, $R_3$, and $R_4$ are amyl.

11. The composition of claim 1 wherein said stabilizing quantity is from about 0.2% to about 2% by weight of each of the components of said stabilizer composition on the weight of said polymer composition.

12. The composition of claim 11 wherein M is zinc.
13. The composition of claim 12 wherein $R_1$, $R_2$, $R_3$, and $R_4$ are butyl.
14. The composition of claim 11 wherein M is calcium.
15. The composition of claim 14 wherein $R_1$, $R_2$, $R_3$, and $R_4$ are amyl.

References Cited by the Examiner
UNITED STATES PATENTS 2,552,570  5/1951  McNab et al. _____ 260—45.75
2,972,596  2/1961  Newland et al. ____ 260—45.9 XR LEON J. BERCOVITZ, *Primary Examiner.*

MILTON STERMAN, *Examiner.*